United States Patent
Markovich et al.

(10) Patent No.: US 6,283,429 B1
(45) Date of Patent: Sep. 4, 2001

(54) MOUNTING ASSEMBLY

(75) Inventors: Nikolai J. Markovich, Hopkinton; Stephen Finnegan, Franklin, both of MA (US); Phillip Lariviere, Woonsocket, RI (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/474,385

(22) Filed: Dec. 29, 1999

(51) Int. Cl.$^7$ ...................................................... H05K 5/02
(52) U.S. Cl. ................................... 248/286.1; 248/291.1; 248/298.1; 248/917; 361/683
(58) Field of Search ........................... 248/222.52, 224.8, 248/225.11, 225.21, 286.1, 291.1, 298.1, 917, 919; 220/334, 335; 312/223.2, 223.3; 361/683, 724, 725

(56) References Cited

U.S. PATENT DOCUMENTS

| | | | |
|---|---|---|---|
| 6,061,966 | * | 5/2000 | Nelson et al. ........................... 49/394 |
| 6,098,952 | * | 8/2000 | Tonn .................................... 248/688 |
| 6,169,249 | * | 1/2001 | Teachout et al. ................... 174/52.1 |

* cited by examiner

Primary Examiner—Ramon O. Ramirez
Assistant Examiner—Jon Szumny
(74) Attorney, Agent, or Firm—Daly, Crowley & Mofford, LLP (57) ABSTRACT

A mounting assembly configured to hold the bottom surface of the computer in a horizontal orientation for use of the computer by an operator and to enable the computer to pivot to a vertical orientation to store the computer in a cabinet. The assembly includes: a cabinet-mounting member having a rear section configured for fastening to the cabinet; and, a manually detachable computer-supporting member. When attached to the cabinet-mounting member, the computer-supporting member is adapted to pivot relative to the mounting member. The cabinet-mounting member has a pair of laterally spaced side arms. The side arms have proximal ends terminating at the rear section and distal ends projecting outwardly from the cabinet-mounting member. The laterally spaced side arms have an inner region disposed there between. A pair of spring-loaded pin assemblies is mounted to the pair of side arms. The pin assemblies are configured to urge a distal end of a pin thereof to project into the inner region and enable the pin to be manually retracted away from the inner region. At least one of such side arms has at the distal end thereof a hook-shaped latch disposed forward of one of the spring-loaded pin assemblies. A rear portion of the computer-supporting member is configured for insertion into the inner region when the pins are in the retracted position. The computer-supporting member also includes a mounting plate configured for attachment to the bottom of the computer. The computer mounting plate is configured to pivot, relative to the cabinet-mounting member, between the horizontal orientation and the vertical orientation. The computer-supporting member has sidewalls which have slots therein adapted to receive the pins when the pins are spring-loaded and project through the slots into the inner region. When the pins are in the slots, the computer-supporting member is thus pivotally attached to the cabinet-supporting member. The sidewalls have posts extending outwardly therefrom. The posts are configured to be lowered onto a trough-like bottom wall of the hook-shaped latch to thereby hold the bottom of the computer in the horizontal orientation. The pins and slots are configured to enable the mounting plate to be manually raised to release the posts from the bottom wall of the hook-shaped. When released, the mounting plate is urged in a forward direction as the post slides in forward in the slot. When the posts are released from the latches, the mounting plate is then pivoted about the pins and the bottom computer-supporting member is lowered to position the computer in the vertical orientation.

8 Claims, 11 Drawing Sheets

MOUNTING ASSEMBLY

BACKGROUND OF THE INVENTION

This invention relates generally to mounting assemblies and more particularly to mounting assemblies used to mount a service processor in the form of a laptop computer to an electrical cabinet for storing electrical components serviceable by the computer.

As is known in the art, many electrical storage cabinets have laptop computers mounted to them, such as, for example, to door of the cabinet. The computer is electrically connected to components within the cabinet to enable such components to be serviced, e.g., tested or programmed, by the computer. As is also known, it is frequently desirable to have the computer attached to a mounting assembly adapted to hold the computer in a horizontal orientation for use by an operator and be manually repositioned to a vertical orientation for storage in the cabinet when the cabinet door is closed. Further, it is desirable that the assembly is easy to manually remove and reattach from the door and also is easy to reposition the computer between the horizontal and vertical orientations.

SUMMARY OF THE INVENTION

In accordance with the present invention, a mounting assembly is provided. The assembly is configured to hold the bottom surface of the computer in a horizontal orientation for use of the computer by an operator and to enable the computer to pivot to a vertical orientation to store the computer in a cabinet. The assembly includes: a cabinet-mounting member having a rear section configured for fastening to the cabinet; and, a manually detachable computer-supporting member. When attached to the cabinet-mounting member, the computer-supporting member is adapted to pivot relative to the mounting member. The cabinet-mounting member has a pair of laterally spaced side arms. The side arms have proximal ends terminating at the rear section and distal ends projecting outwardly from the cabinet-mounting member. The laterally spaced side arms have an inner region disposed there between. A pair of spring-loaded pin assemblies is mounted to the pair of side arms. The pin assemblies are configured to urge a distal end of a pin thereof to project into the inner region and enable the pin to be manually retracted away from the inner region. At least one of such side arms has at the distal end thereof a hook-shaped latch disposed forward of one of the spring-loaded pin assemblies. The computer-supporting member has a rear portion configured for insertion into the inner region when the pins are in the retracted position. The computer-supporting member also includes a mounting plate configured to have mounted thereto the bottom of the computer. The computer-supporting member has sidewalls with slots therein adapted to receive the pins when the pins are spring-loaded and project through the slots into the inner region. When the pins are in the slots, the computer-supporting member is thus pivotally attached to the cabinet-supporting member. One of the sidewalls has a post extending outwardly therefrom. The post is configured so that it can be lowered onto a trough-like bottom wall of the hook-shaped latch. Once lowered onto the bottom wall, the computer is held by the latch and post in the horizontal orientation. The pins and slots are configured to enable the mounting plate to be manually raised to release the post from the bottom wall of the hook-shaped latch. When released, the mounting plate is urged in a forward direction as the pins slide forward in the slot. When the post is released from the latch, the forward positioned computer-mounting plate is then pivoted about the pins, the post is rotated above and forward of the latch, and the computer-supporting member is lowered to position the computer in the vertical orientation. The process is reversed to re-position the post in the hook-shaped latch and thereby place the computer in the horizontal orientation.

BRIEF DESCRIPTION OF THE DRAWINGS

These and other features of the invention will become more readily apparent from the detailed description taken together with the accompanying drawings, in which:

FIGS. 4A through 4C are plan views of a cabinet-mounting member and a computer-mounting member of the mounting assembly shown in FIG. 2, FIG. 4A showing the two members in a separated position; FIG. 4B showing the cabinet-mounting member in a configuration to receive the computer-supporting member; and FIG. 4C showing the two members connected to each other;

FIGS. 6A1 and 6B1 are side elevation exploded views showing a portion of the cabinet-mounting member and the computer-supporting member in the engaged relationship, FIG. 6A' showing the computer-supporting member in the horizontal orientation and FIG. 6B' showing the computer-supporting member in the vertical orientation, the portion in FIG. 6A' being encircled by the arrow labeled 6A1 6A1 in FIG. 6A and the portion in FIG. 6B1 being encircled by the arrow labeled 6B1 6B1 in FIG. 6B.

DESCRIPTION OF THE PREFERRED EMBODIMENTS

Figure 1:
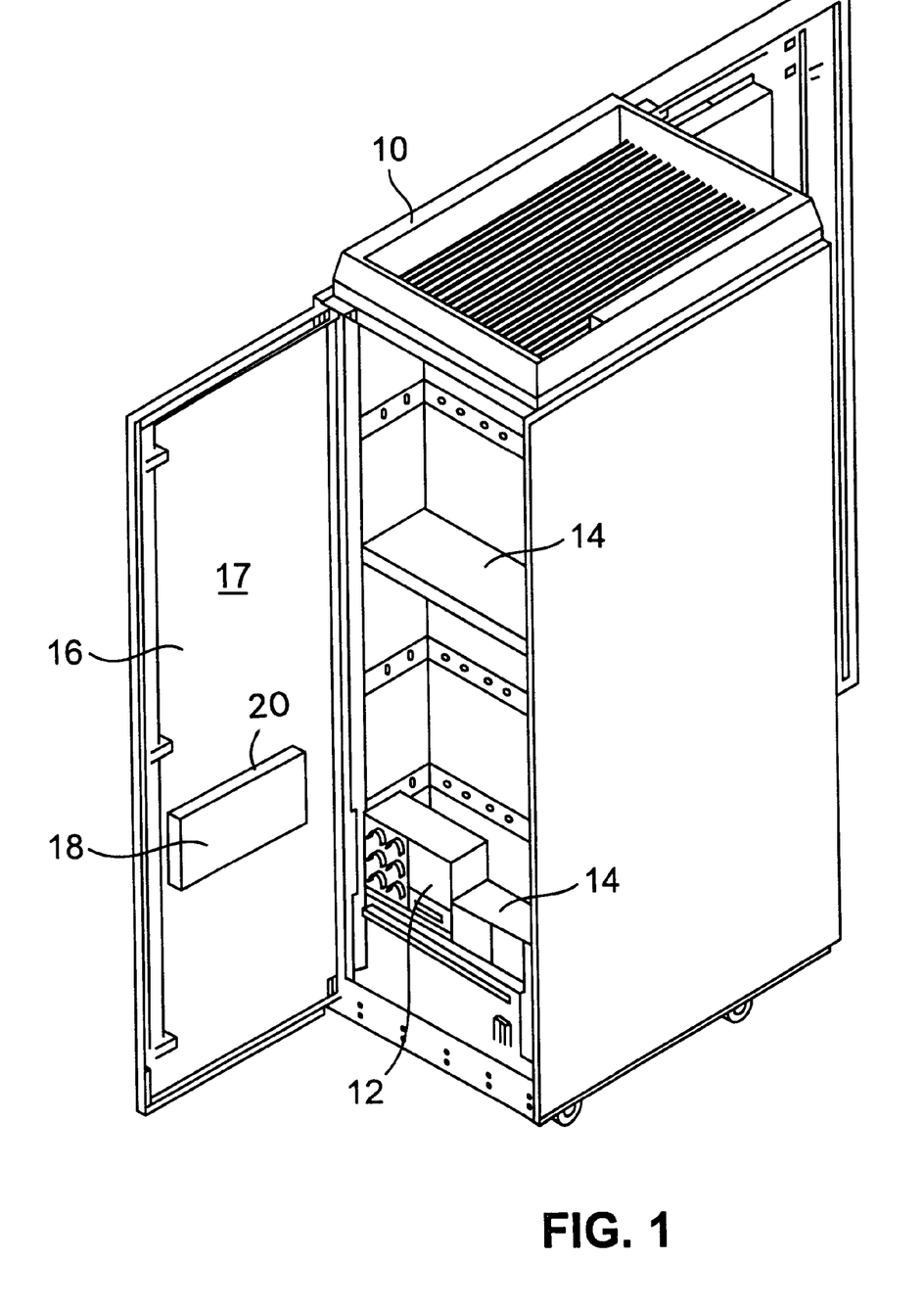
FIG. 1 is a sketch of an electrical component storage cabinet having mounted to an inner surface of a door thereof a laptop computer, such computer being mounted to the door by a mounting assembly according to the invention, such computer being shown in a vertical orientation to enable the door to close.
Figure 2:
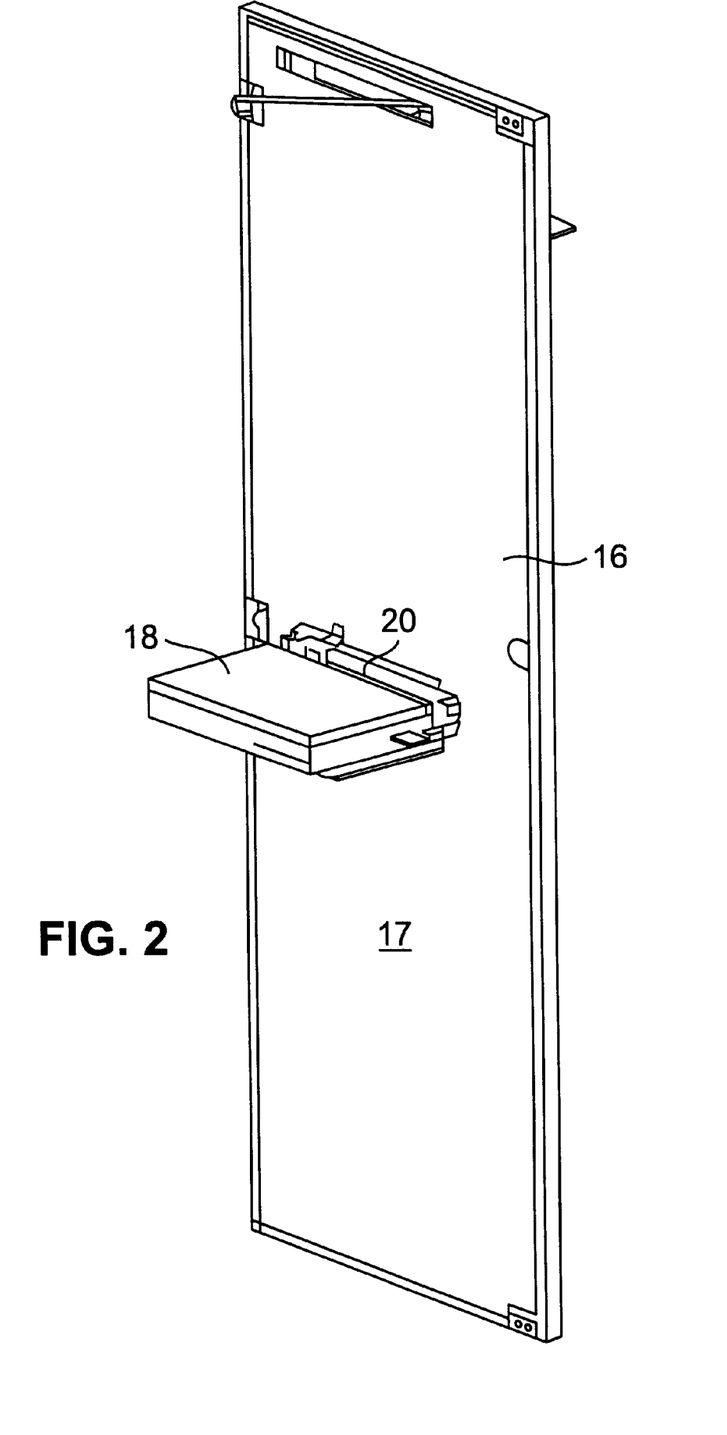
FIG. 2 is a sketch of the door from the cabinet in FIG. 1, such sketch showing the computer mounted to the door by the mounting assembly according to the invention, such computer being shown in a horizontal orientation to enable the computer to be used by an operator.

Referring now to FIG. 1, an electrical cabinet 10 is shown. Such cabinet 10 is adapted to house electrical components 12 on shelves 14 in the interior of the cabinet 10. The cabinet 10 has a door 16. A mounting assembly 20 mounts a laptop computer 18 to the inner surface 17 of the door 16. In FIG. 1, the computer 18 is shown in a lowered, vertical orientation to enable the door 16, with the mounted computer 18, to close. In FIG. 2, the computer 18 is shown in a horizontal orientation to enable an operator, not shown, to use the computer 18 to service the electrical components 12. The computer 18 can be manually changed between the vertical orientation (shown in FIG. 1) and the horizontal orientation (shown in FIG. 2) by means of the mounting assembly 20 shown in FIG. 3.

Figure 3:
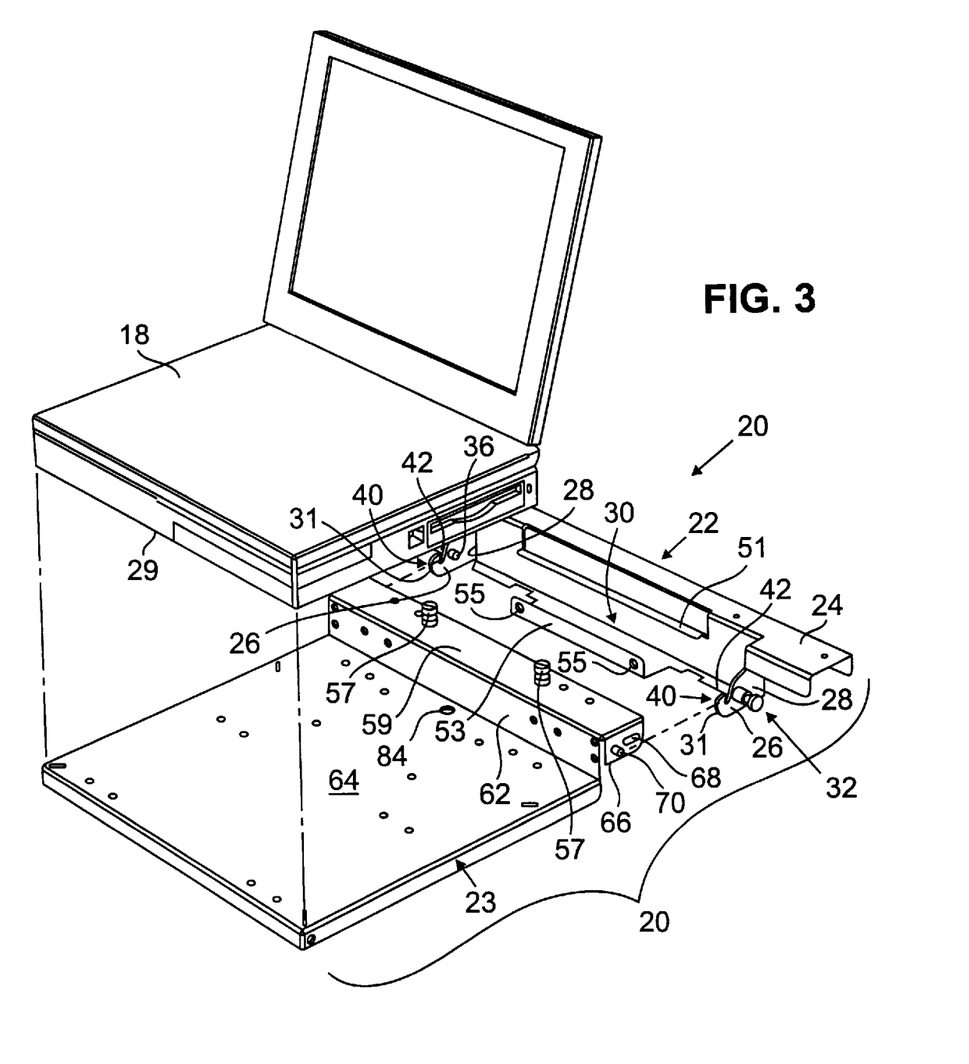
FIG. 3 is an exploded, isometric view of the computer and the mounting assembly according to the invention.
Figures 5, 6A:
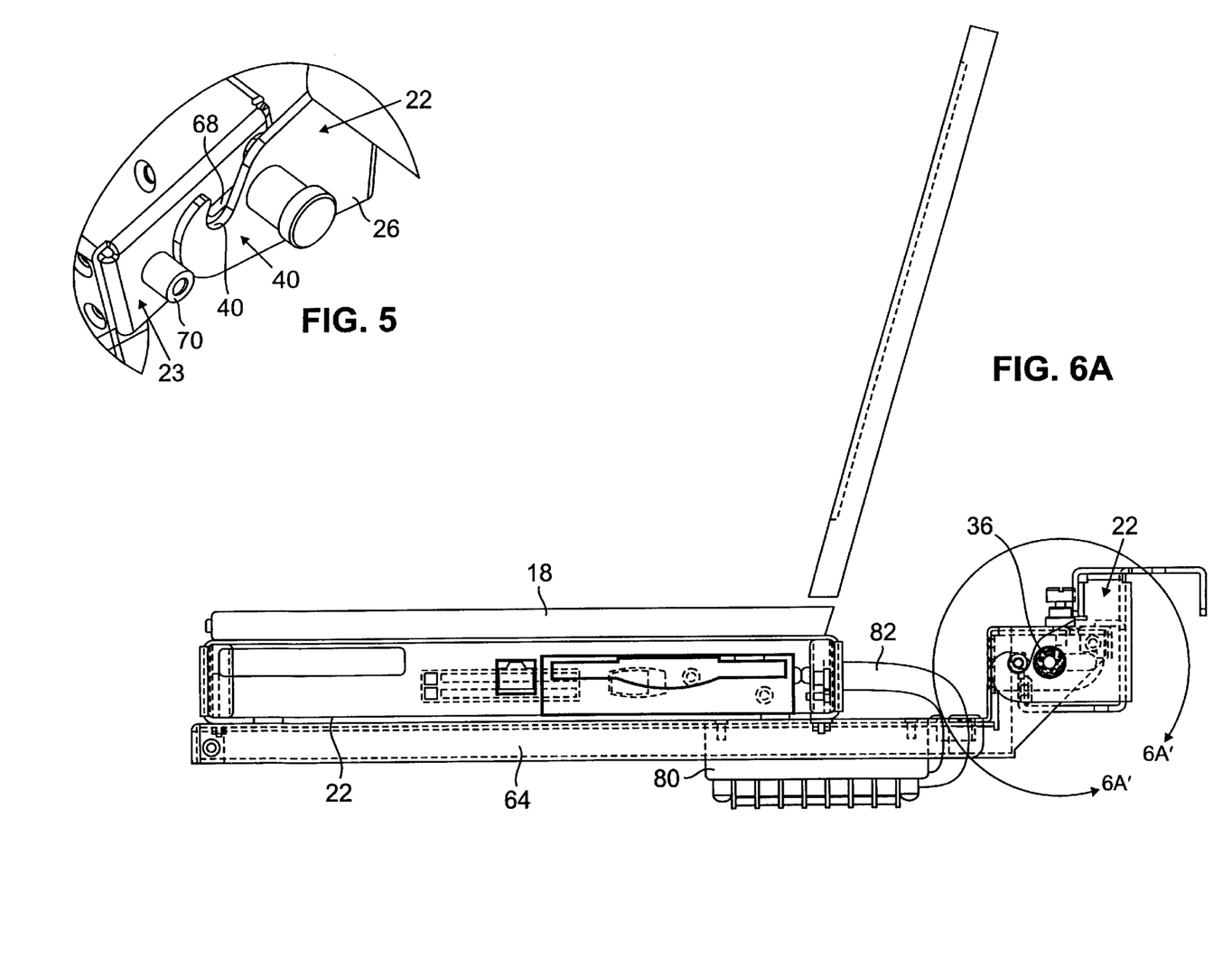
FIG. 5 is an exploded sketch of a latch of the cabinet-mounting member and a post of the computer-supporting member when the members are in a partially pivoted condition and when the post is disengaged from, and forward of, the latch.
FIGS. 6A and 6B are side elevation views showing the cabinet-mounting member and the computer-supporting member in an engaged relationship, FIG. 6A showing the computer-supporting member in a horizontal orientation and FIG. 6B showing the computer supporting member in the vertical orientation, such views showing a computer mounted to one face of a mounting plate of the computer-supporting member and a DC-to-DC converter for the computer mounted to an opposite surface of the supporting plate according to the invention.
Figure 6A:
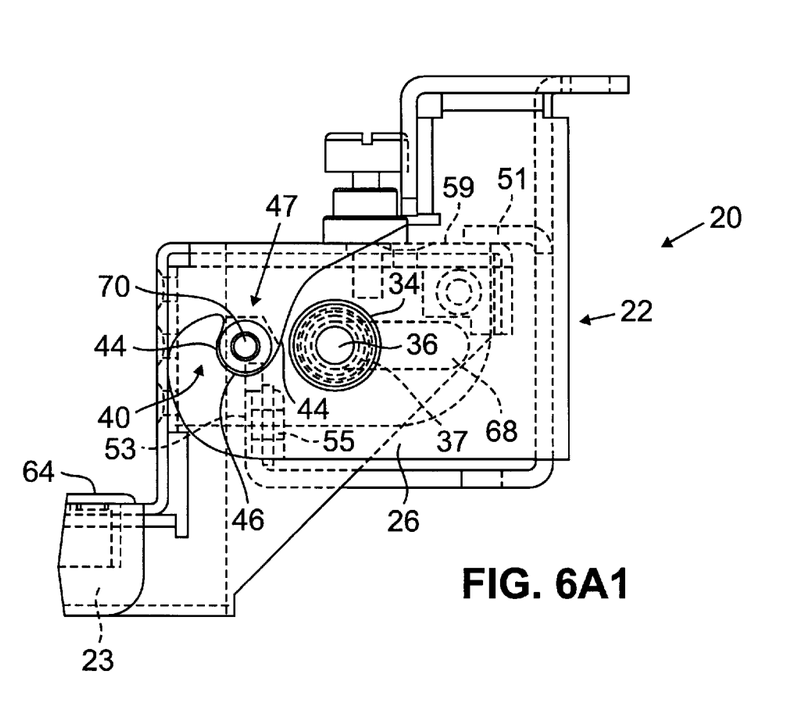
Figure 6B:
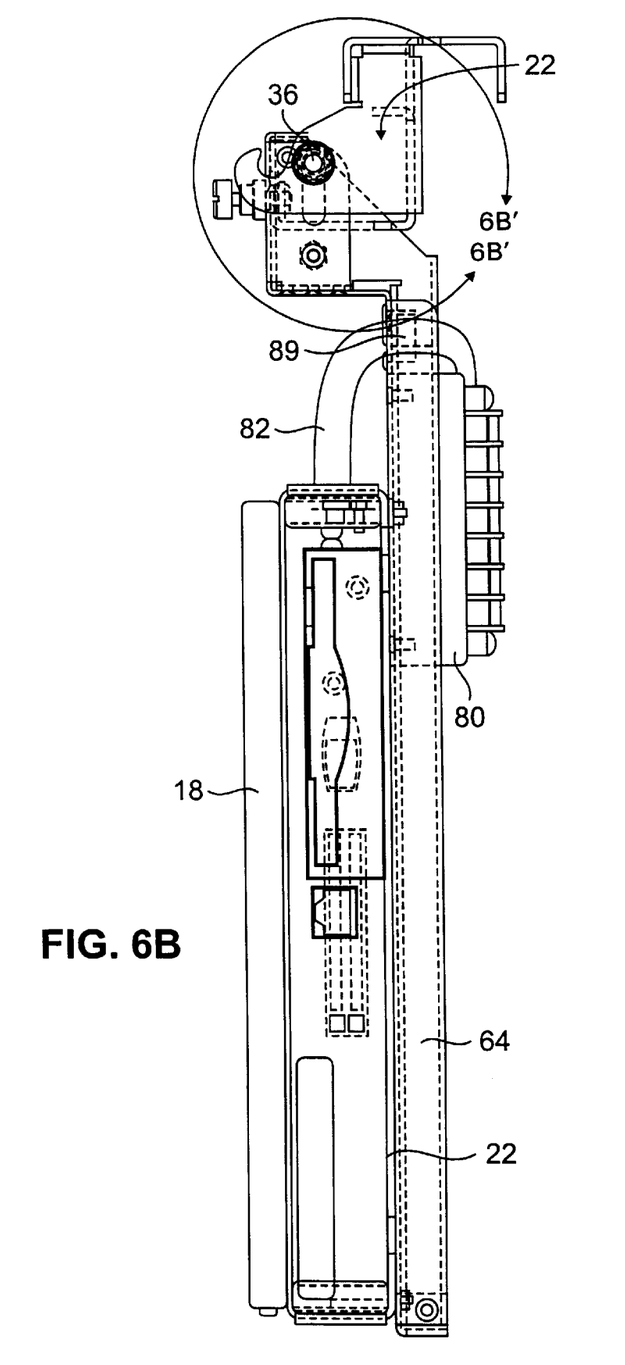
Figures 7A, 7B:
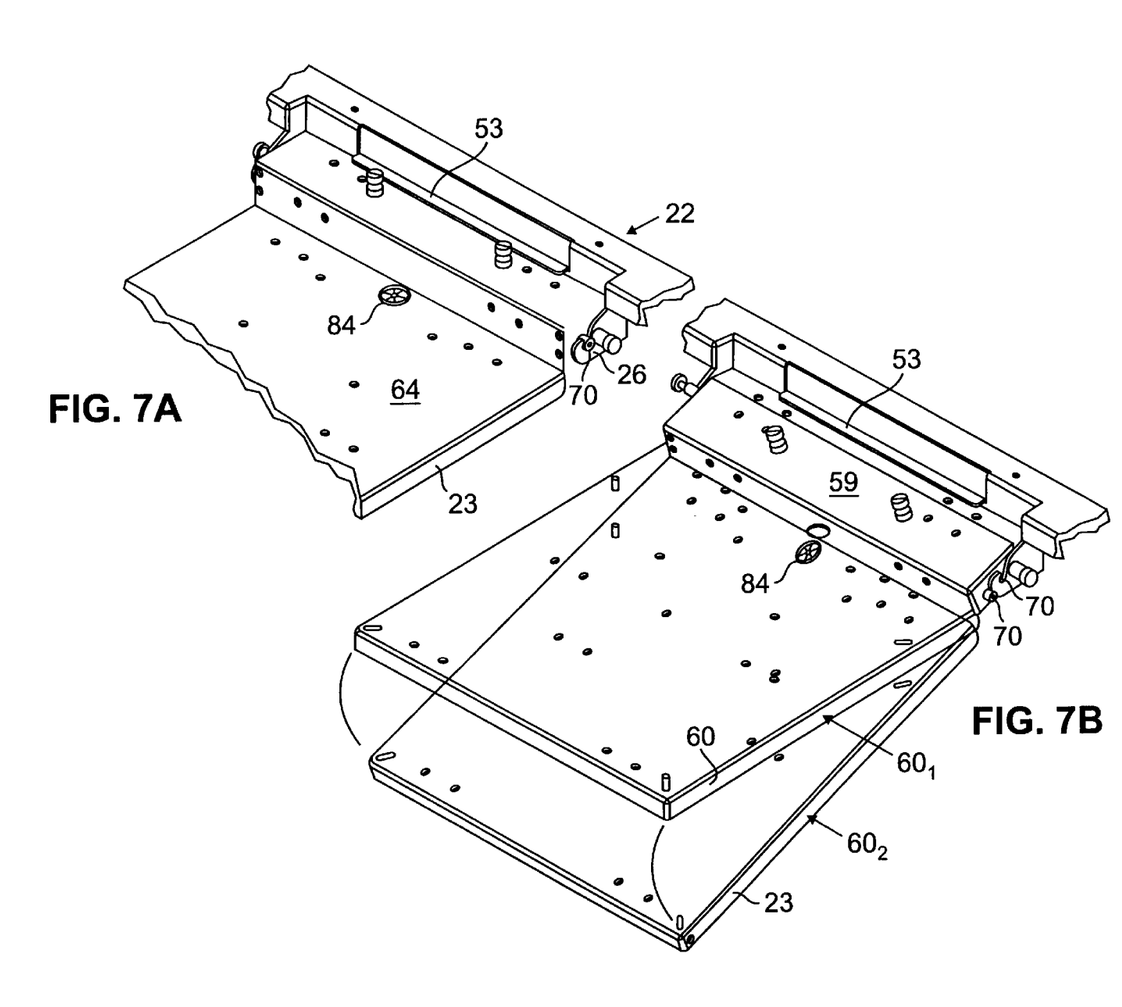
FIGS. 7A through 7C are isometric diagrammatical sketches, showing the computer-supporting member being progressively positioned from the horizontal orientation to the vertical orientation.

Thus, referring to FIG. 3, the mounting assembly 20 is shown to include a cabinet-mounting member 22 and a manually detachable computer-supporting member 23. The cabinet-mounting member 22 is configured to attached to the door 16 (FIG. 1) by any convenient means, such as screws, not shown. The computer-supporting member 23 is adapted to have the computer 18 mounted to it. When the computer-supporting member 23 is manually attached to the cabinet-mounting member 22, as shown in FIG. 7A, the assembly 20 is configured to latch the computer 18 in a horizontal orientation (as shown in FIGS. 2 and 6A). The assembly 20 is configured to enable the computer 18 to be manually released from the latched horizontal orientation and be pivoted to a vertical orientation (FIGS. 1 and 6B).

Figure 4A:
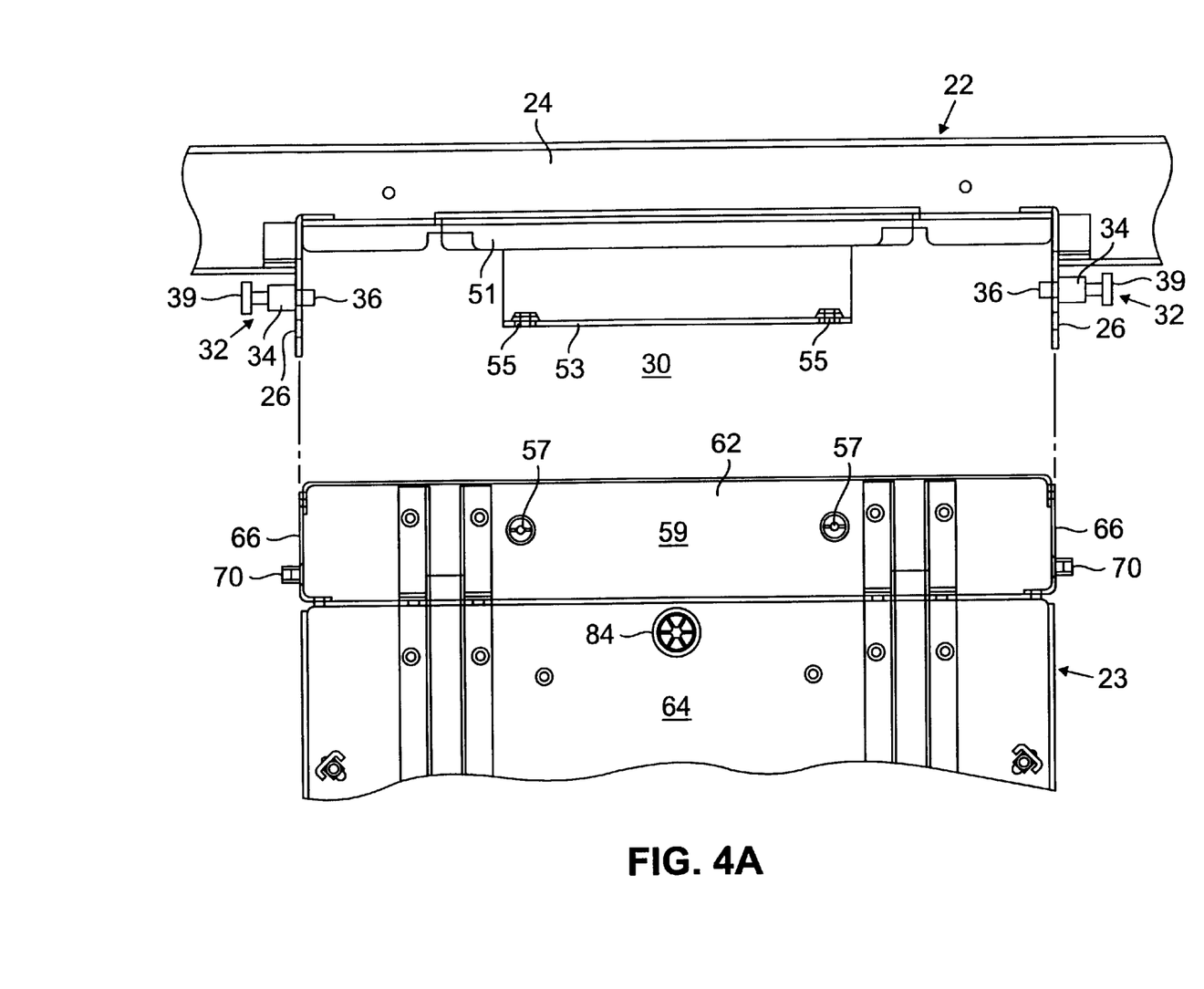
Figure 4B:
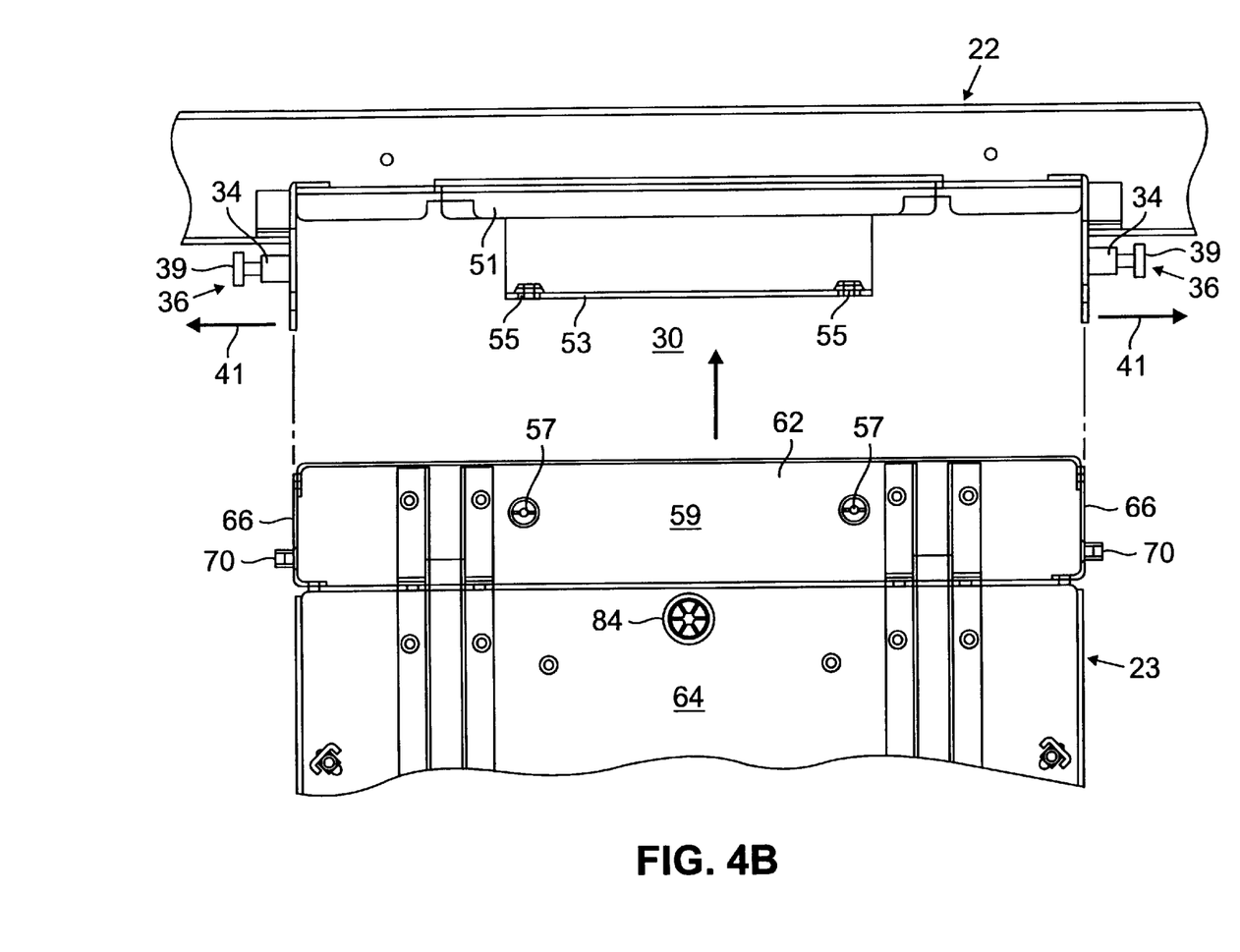

More particularly, and referring to FIG. 3, the mounting member 22 includes a rear section 24 attachable to the door 16 (FIG. 1) as described, and a pair of laterally spaced side arms 26 having proximal ends 28 terminating at the rear section 24. The side arms 26 have distal ends 31 projecting outwardly from the rear section 24 of the mounting-member 22. The laterally spaced side arms 26 have a horizontally oriented inner region 30 disposed there between, as shown more clearly in FIG. 4A. The mounting member 22 also has a pair of pin assemblies 32 mounted to the pair of side arms 26. The pin assemblies 32 have an outer housing 34 (FIG. 4A) affixed to the side arms 26 and a coil spring-loaded pin 36 (FIGS. 6A' and 6B') slidably disposed within the housing 34. The springs 37 are shown as dotted lines since they are hidden with the housings 34. The spring-loaded pins 36 engage coil springs 37 (FIGS. 7A and 7B) in the housings 34. Further, the springs 37 are coiled about the longitudinal axes of the pins 38. The coil springs 37 are biased to urge the distal ends of the pins 36 so that they project into the inner region 30, as shown in FIG. 4A. A manual force applied to a knob 39 on the proximal ends of the pins 36 (FIG. 4A) in the direction shown by arrows 41 (FIG. 4B) manually retracts the distal ends of the pins 36 towards the housings 34 and away from the inner region 30, as shown in FIG. 4B. The side arms 26 have at the distal end thereof, a pair of hook-shaped latches 40 as shown more clearly in FIGS. 3, 5, 6A, 6B, 6A' and 6B'. Each latch 40 has on open top region, 42 sidewalls 44 and a bottom trough-like region 46.

The mounting member 22 has a horizontally positioned flange 51 and a vertically positioned flange 53. The vertically positioned flange 53 has a pair of captive nuts 55, as indicated. Reference is also made to FIGS. 4A, 6A, and 6B.

Referring again to FIG. 3, the computer-supporting member 23 has a rear portion 62 configured for insertion into the inner region 30 when the pins 36 (FIGS. 4A and 4B) are in the retracted position shown in FIG. 4B. The supporting member 60 includes a mounting plate 64 configured to have mounted thereto the bottom 29 (FIGS. 1, 6A and 6B) of the computer 18. When mounted to the cabinet-mounting member 22, the computer-mounting plate 64 is configured to pivot about the pins 36 relative to the mounting member 22.

Figure 6B:
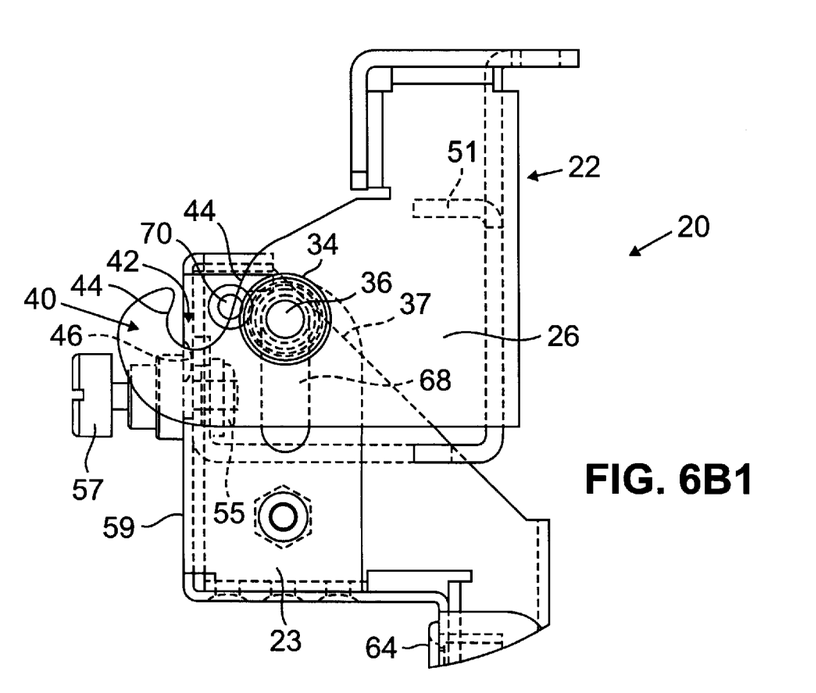
Figure 7C:
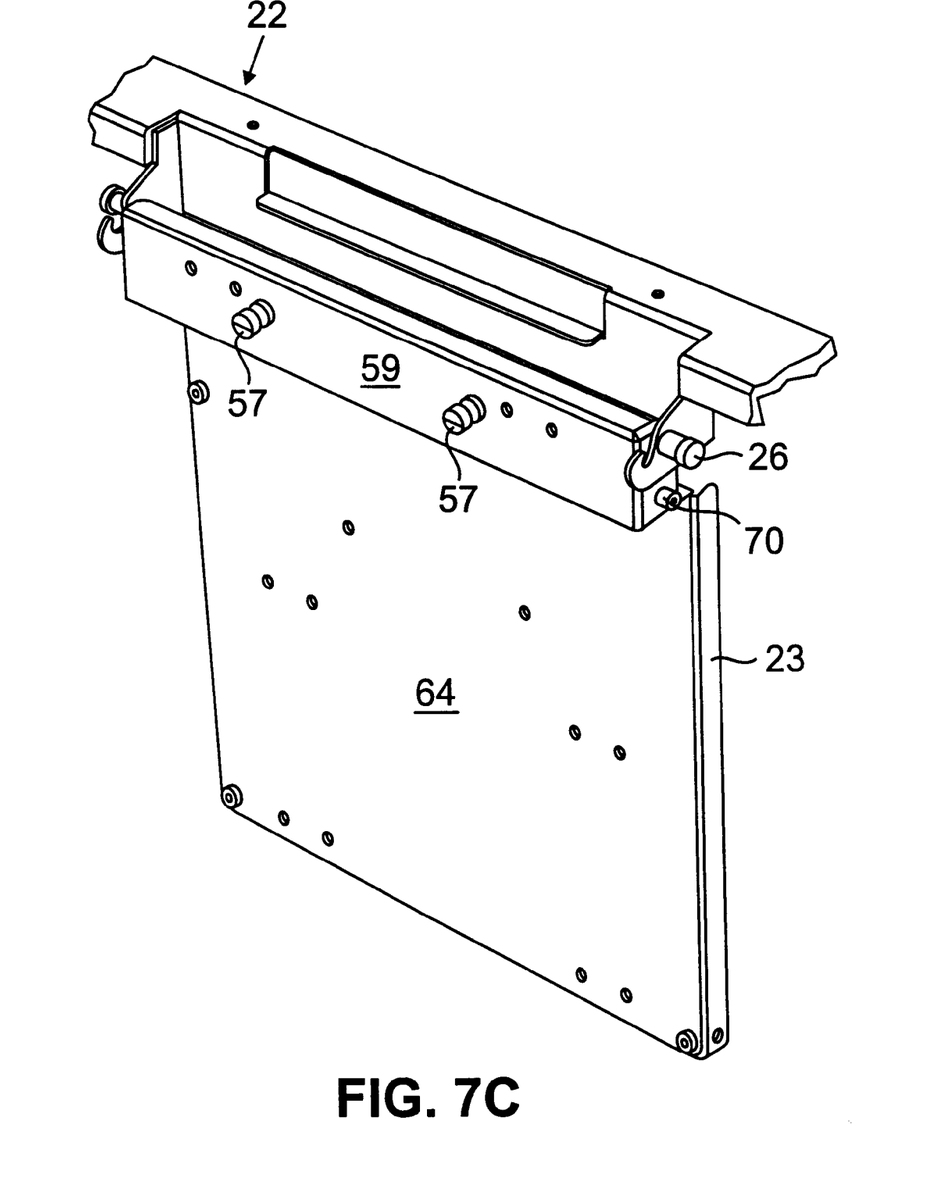

Thus, the computer-mounting member 22 is adapted to pivot relative to the cabinet-mounting member 22 between the horizontal orientation shown in FIGS. 2, 6A and 7A and the vertical orientation shown in FIGS. 1, 6B and 7C. Further, the computer mounting plate 23 has a pair of captive screws 57 in a top surface member 59. Reference is also made to FIGS. 4A–4C, 7A, 7C, 6A' and 6B'.

Figure 4C:
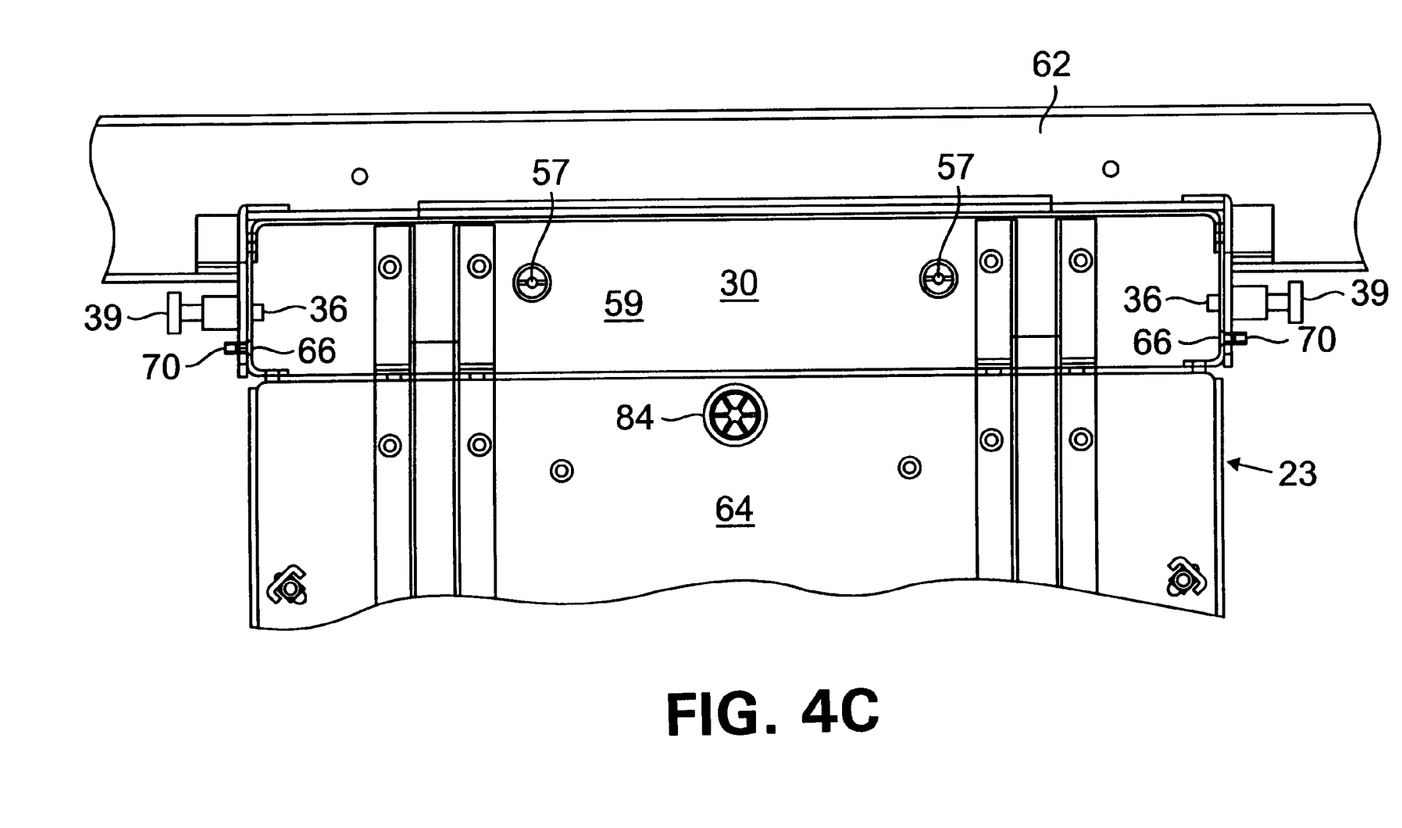

More particularly, and referring to FIG. 3, the rear portion 62 of the mounting plate 60 has disposed on a pair of sidewalls 66 (FIGS, 3, 4A, 4B, 4C and FIG. 5) thereof a pair of elongated slots 68 (only one of the slots 68 being visible in FIG. 3). The slots 68 are adapted to receive the pins 36 when the pins 26 are spring-loaded and project through the slots 36 into the inner region 30, as shown in FIG. 4C. The sidewalls 66 also have posts 70 extending outwardly from the sidewalls 66 of the rear portion 62 (FIG. 3). The posts 70 are configured to engage the trough-like bottom region 46 (FIG. 6A') of the latch 42 and the top surface member is arranged to engage the bottom of horizontally positioned flange 51 to thereby hold the bottom of the computer 18 in the horizontal orientation, as shown in FIG. 6A. It is noted that when in the horizontal position shown in FIG. 6A, the pins 36 are in the forward region of the slots 68. The pins 36 and slots 68 are configured to enable the mounting plate 60 to be lifted in the vertical orientation to thereby lift the posts 36 from the trough 46. Once lifted from the trough-like bottom region 45, the posts 70 are released from hook 42. Once released, the mounting plate 60 may be urged in a forward direction as the pins 36 slide to the rearward ends of the slots 68 and the mounting plate 60 may then be pivoted about (i.e., over) the pins 36 to orient the computer 18 in the vertical orientation. This vertical position may be maintained by threading the screws 57 into the nuts 59, as indicated in FIG. 6B. Thus, referring to FIG. 7B, the posts 70 are shown released from the latch 70 as the mounting plate 60 pivots vertically from position $60_1$ to position $60_2$.

Assembly and Operation

The computer-supporting member 22 may be attached to the cabinet-supporting member 20 as follows: Once the cabinet-mounting member 22 is mounted to the door 16 (FIG. 1), an installer grabs the heads 39 of the spring-loaded pins 36 with his/her thumbs while holding the rear sides of the computer-support member 23 in the palms and remaining fingers. The thumbs are used to pulls the pin-heads 39 outwardly as shown by the arrows 41 (FIG. 4B) and thereby retract the pins 36 into the housing 34. The retraction of the pins 36 from region 30 thereby enables insertion of the rear section 62 of the computer-supporting member 23 into the region 30 (FIGS. 4A and 4B). It is noted that during the insertion, the posts 70 are elevated over the hook-shaped latches 40. The pins 36 are slid towards the rear of the slots 68 until the posts 70 are aligned with the trough-like bottom walls 46 of the latches 40. Once aligned, the installer releases his /her thumbs from the heads to the pins 36 so that the pins 36 pass through the slots 68 and into the inner region 30. Because the pins 36 are in the slots 68, the computer-supporting member 23 is able to pivot about the pins 36 and the posts 70 can be lowered to rest on bottom walls 46 of the hook-shaped latches 40. When the posts 70 rest on the bottom walls 46 of the lathes 40, the top surface member 59 contacts the bottom of the horizontally positioned flange 51 to thereby hold the computer 18 in the horizontal orientation, as shown in FIGS. 6A and 6A'.

To lower the computer 18 to the vertical orientation, the operator lifts the posts 70 from the hook-shaped latches 40 and slides the computer-supporting member 23 forward.

Thus, the pins 36 slide to the rear portion of the slots 68 and the top surface member 59 slides forward of the horizontally positioned flange 59, as indicated in FIG. 7B. Once the posts 70 clear the latches 40, the operator lowers the computer 18 to the vertical orientation. That is, when the post 70 is released from the latch 40, the forward positioned computer-mounting member 23 is then pivoted about the pins 36, the posts 70 are rotated above and forward of the latches 40, and the computer-supporting member 23 is lowered to position the computer in the vertical orientation. The vertical orientation may be maintained by threading the screws 57 into the nuts 59, as indicated in FIG. 6B'. The process is reversed to re-position the posts in the hook-shaped latches with the top surface member in contact with the horizontally positioned flange 51 and thereby hold the computer in the horizontal orientation.

Referring now to FIGS. 6A and 6B, the computer 18 is shown mounted to the mounting plate 64. More particularly, it is noted that the bottom surface 22 of the computer 18 is mounted to the top surface of the mounting plate 64 and that a DC-to-DC converter 80 is mounted to the bottom surface of the mounting plate 64. The power cable 82 for the computer 18 passes through a hole 84 (FIGS. 3, 4A, 4B and 4C) through the mounting plate 64 to the output of the DC-to-DC converter 80. The DC-to-DC converter 80 is fed power by a battery, not shown, internal to the cabinet 10 (FIG. 1) by a cable, not shown.

Other embodiments are within the spirit and scope of the appended claims.

What is claimed is:

1. A mounting assembly for mounting to a bottom surface of a laptop computer, such assembly being adapted to hold the bottom surface of the computer in a horizontal orientation for use of the computer by an operator and to enable the computer to pivot to a vertical orientation for storage of the computer in a cabinet, such assembly comprising:
   (A) a cabinet-mounting member having:
      a rear section configured for fastening to the cabinet;
      a pair of laterally spaced side arms having proximal ends terminating at the rear section and having distal ends projecting outwardly from the mounting member, such laterally spaced side arms having an inner region disposed there between;
      a pair of pin assemblies mounted to the pair of side arms, and configured to urge distal ends of the pins in the assemblies to project into the inner region and enable the pins to be manually retracted away from the inner region;
      At least one of such side arms having a latch at the distal end thereof;
   (B) a supporting member having a rear portion configured for insertion into the inner region when the pins are in the retracted position, such supporting member comprising:
      a mounting plate configured to have mounted thereto the bottom of the computer, such mounting plate, comprising:
      a pair of elongated slots adapted to receive the pins when the pins project though the slots into the inner region;
      a post configured to rest in the latch and thereby hold the bottom of the computer in the horizontal orientation, such latch being configured to enable the post to be manually released from the latch, then enable the mounting plate to be urged in a forward direction as the post slides in the slot, and then finally enable the mounting plate to pivot about the pins and orient the bottom of the computer in the vertical orientation.

2. The assembly recited in claim 1 wherein the latch is hook-shaped.

3. The assembly recited in claim 2 wherein one of the pins is disposed between the latch and the rear section of the cabinet-mounting member.

4. The assembly recited in claim 3 wherein the slot is disposed rearward of the post.

5. The assembly recited in claim 1 including a DC-to-DC converter mounted to a bottom surface of the supporting plate.

6. The assembly recited in claim 5 wherein the mounting plate has a hole passing therethrough between the bottom surface of the plate and an upper surface of the plate, and wherein the computer is mounted to the upper surface of the plate and wherein the assembly includes a cable passing through the hole and connecting the computer to the DC-to-DC converter.

7. A mounting assembly for mounting to a bottom surface of a laptop computer, such assembly being adapted to hold the bottom surface of the computer in a horizontal orientation for use of the computer by an operator and to enable the computer to pivot to a vertical orientation for storage of the computer in a cabinet, such assembly comprising:
   (A) a cabinet-mounting member having:
      a rear section configured for fastening to the cabinet;
      a pair of laterally spaced side arms having proximal ends terminating at the rear section and having distal ends projecting outwardly from the mounting member, such laterally spaced side arms having an inner region disposed there between;
      a pair of pin assemblies mounted to one of the pair of side arms, and configured to urge a distal ends of pins in each the assemblies to project into the inner region and enable the pins to be manually retracted away from the inner region;
      at least one of such side arms having at the distal end thereof a latch;
   (B) a supporting member having a rear portion configured for insertion into the inner region when the pins are in the retracted position, such supporting member comprising:
      a mounting plate configured to have mounted thereto the bottom of the computer, such mounting plate, comprising:
      a pair of elongated slots adapted to receive a corresponding one of the pins when such pins project though the slots into the inner region;
      a post configured to rest in the latch and thereby hold the bottom of the computer in the horizontal orientation, such latch being configured to enable the post to be manually released from the latch, then enable the mounting plate to be urged in a forward direction as the post slides in the slot, and then finally enable the mounting plate to pivot about the pins and orient the bottom of the computer in the vertical orientation.

8. A mounting assembly for mounting to a bottom surface of a laptop computer, such assembly being adapted to hold the bottom surface of the computer a horizontal orientation for use of the computer by an operator and to enable the computer to pivot to a vertical orientation for storage of the computer in a cabinet, such assembly comprising:
   (A) a cabinet-mounting member having:
      a rear section configured for fastening to the cabinet;
      a pair of laterally spaced side arms having proximal ends terminating at the rear section and having distal ends projecting outwardly from the mounting member, such laterally spaced side arms having a horizontally oriented inner region disposed there between;

a pair of pin assemblies mounted to the pair of side arms, each one of such pin assemblies having an outer housings affixed to a corresponding one of the side arms and a spring-loaded pin slidably disposed within the housing, such spring-loaded pin being configured to urge a distal end of such pin to project into the inner region and enable the pin to be manually retracted into the housing and away from the inner region;

at least one of such side arms having at the distal end thereof a hook-shaped latch, such latch having on open top region, sidewalls and a bottom trough-like region;

(B) a computer-supporting member having a rear portion configured for insertion into the inner region when the pins are in the retracted position, such supporting member comprising:

a mounting plate configured to have mounted thereto the bottom of the computer, such mounting plate being configured to pivot relative to the bottom of the computer between the horizontal orientation and the vertical orientation; such rear portion having disposed on a sidewall thereof:

a pair of elongated slots adapted to receive the pins when the pins are spring-loaded and project through the slots into the inner region; a post extending outwardly from the sidewall of the rear portion, such post being configured to engage the trough of the latch when the assembly holds the bottom of the computer in the horizontal orientation, such pins and slots being configured to enable the mounting plate to be lifted in the vertical orientation and thereby lift the post from the trough, then enable the mounting plate to be urged in a forward direction as the pins slide rearward in the slots, and then enable the mounting plate to pivot and move to orient the computer in the vertical orientation.

* * * * *